United States Patent
Okamoto et al.

(10) Patent No.: US 10,119,022 B2
(45) Date of Patent: Nov. 6, 2018

(54) POLYCARBONATE RESIN COMPOSITION

(71) Applicant: IDEMITSU KOSAN CO., LTD., Chiyoda-ku (JP)

(72) Inventors: Yoshio Okamoto, Chiba (JP); Tsuyoshi Murakami, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 36 days.

(21) Appl. No.: 15/118,015

(22) PCT Filed: Feb. 13, 2015

(86) PCT No.: PCT/JP2015/053977
§ 371 (c)(1),
(2) Date: Aug. 10, 2016

(87) PCT Pub. No.: WO2015/122492
PCT Pub. Date: Aug. 20, 2015

(65) Prior Publication Data
US 2017/0044363 A1 Feb. 16, 2017

(30) Foreign Application Priority Data

Feb. 13, 2014 (JP) ................................. 2014-025712

(51) Int. Cl.
*C08L 69/00* (2006.01)
*C08K 5/521* (2006.01)
*C08L 51/04* (2006.01)
*C08L 55/02* (2006.01)
*C08L 33/10* (2006.01)

(52) U.S. Cl.
CPC .............. *C08L 69/00* (2013.01); *C08K 5/521* (2013.01); *C08L 51/04* (2013.01); *C08L 55/02* (2013.01); *C08L 33/10* (2013.01); *C08L 2201/02* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | |
|---|---|---|
| 2005/0182165 A1 | 8/2005 | Ma et al. |
| 2009/0036593 A1 | 2/2009 | Derudder et al. |
| 2009/0203831 A1* | 8/2009 | Ma ........................... C08L 69/00 524/522 |
| 2009/0215949 A1* | 8/2009 | Fujiguchi ................ C08L 69/00 524/430 |
| 2014/0303296 A1* | 10/2014 | Inazawa ................... C08K 3/34 524/127 |

FOREIGN PATENT DOCUMENTS

| | | |
|---|---|---|
| CN | 1938383 A | 3/2007 |
| CN | 106133057 A | 11/2016 |
| JP | 4-285655 A | 10/1992 |
| JP | 2000-191898 A | 7/2000 |
| JP | 2001-55500 A | 2/2001 |
| JP | 2006-52401 A | 2/2006 |
| JP | 2008-516013 A | 5/2008 |
| TW | A-201331293 | 8/2013 |
| WO | 2009/017938 A1 | 2/2009 |
| WO | 2013/081161 A1 | 6/2013 |
| WO | WO-2013081161 A1 * | 6/2013 ............... C08K 3/34 |

OTHER PUBLICATIONS

Ellis, et al. "Polymers: A Property Database" p. 1031, Oct. 29, 2008. (Year: 2008).*
UL Thermoplastics Testing Center—Charpy Impact test, Downloaded Jan. 24, 2018. (Year: 2018).*
UL94 Specification, Jul. 10, 1998. (Year: 1998).*
International Search Report dated Mar. 10, 2015 in PCT/JP15/053977 Filed Feb. 13, 2015.
Combined Office Action and Search Report dated May 3, 2017 in Chinese Patent Application No. 201580007829.7 (with English translation of categories of cited documents).
Extended European Search Report dated Aug. 16, 2017 in Patent Application No. 15748947.7.
Office Action dated Jun. 5, 2018, in the corresponding Japanese Patent Application No. 2015-562874, with machine translation.
Office Action dated Jun. 25, 2018, in the corresponding Taiwanese Patent application No. 104105196.
Office Action dated Aug. 9, 2018 in Chinese Patent Application No. 201580007829.7, dated Feb. 13, 2015.

* cited by examiner

*Primary Examiner* — Christopher M Rodd
(74) *Attorney, Agent, or Firm* — Oblon, McClelland, Maier & Neustadt, L.L.P.

(57) ABSTRACT

Provided is a polycarbonate resin composition, including: a polycarbonate resin (A) containing a polycarbonate-polyorganosiloxane copolymer (A-1) having a specific structure; a copolymer (B) having constituent units derived from acrylonitrile and styrene, and being free of a constituent unit derived from methyl methacrylate; a copolymer (C) having constituent units derived from butadiene and methyl methacrylate; and a flame retardant (D), the resin composition satisfying a predetermined expression (a).

13 Claims, No Drawings

POLYCARBONATE RESIN COMPOSITION

CROSS-REFERENCE TO RELATED APPPLICATION

This application a National Stage of PCT/JP2015/053977, which was filed on Feb. 13, 2015. This application is based upon and claims the benefit of priority to Japanese Application No. 2014-025712, which was filed on Feb. 13, 2014.

TECHNICAL FIELD

The present invention relates to a polycarbonate resin composition.

BACKGROUND ART

A polycarbonate-polyorganosiloxane copolymer (hereinafter sometimes referred to as "PC-POS") has been attracting attention because of its excellent properties such as high impact resistance, chemical resistance, and flame retardancy. Accordingly, a polycarbonate resin composition containing the PC-POS has been expected to be widely utilized in various fields such as the field of electrical and electronic equipment, and the field of automobiles. In particular, the utilization of the polycarbonate resin composition containing the PC-POS in housings for a cellular phone, a mobile personal computer, a digital camera, a video camera, an electric tool, and the like, and in other commodities has been expanding.

In the polycarbonate resin composition containing the PC-POS, investigations have been made on further improvements in impact resistance and flame retardancy thereof, and the impartment of any other characteristic, such as flowability, thereto. For example, in each of Patent Documents 1 and 2, there is a disclosure of a thermoplastic resin composition that contains a predetermined amount of each of a polycarbonate resin, an acrylonitrile-styrene copolymer (hereinafter sometimes referred to as "AS") or an acrylonitrile-butadiene-styrene copolymer (hereinafter sometimes referred to as "ABS"), a polysiloxane-polycarbonate copolymer, and a phosphorus-containing flame retardant, and that is improved in flowability and flame retardancy substantially without the deterioration of its impact strength.

In each of Patent Documents 3 and 4, as a polycarbonate resin composition that satisfies moldability, impact resistance, and rigidity while maintaining excellent flame retardancy, and that can be molded into a molded body excellent in thermal stability, there is a disclosure of a polycarbonate resin composition containing, for example, a polycarbonate resin, a styrene-based resin, and a polycarbonate-polyorganosiloxane copolymer and/or a functional group-containing silicone compound.

In addition, in Patent Document 5, there is a disclosure of a polycarbonate resin composition that contains a polycarbonate and/or a copolyester carbonate having an aliphatic segment, an ABS-based resin and/or an acrylonitrile-styrene (SAN) resin, a phosphate-based compound, and a polysiloxane-polycarbonate block copolymer, and that has excellent flame retardancy even when molded into a thin shape.

CITATION LIST

Patent Document

[Patent Document 1] JP 2006-52401 A
[Patent Document 2] JP 2008-516013 A
[Patent Document 3] JP 2000-191898 A
[Patent Document 4] JP 2001-55500 A
[Patent Document 5] JP 04-285655 A

SUMMARY OF THE INVENTION

Technical Problem

A polycarbonate resin composition that can be molded into a thin-walled and large-sized molded body is required to have high flowability comparable to that of an ABS resin. However, when an attempt is made to improve the flowability of a polycarbonate resin composition containing a PC-POS, its impact strength tends to reduce, and hence it has heretofore been difficult to achieve both the flowability and the impact strength at high levels.

Further, the addition of the ABS resin, an AS resin, or the like to the polycarbonate resin composition for improvements in flowability and impact resistance thereof involves a problem in that its flame retardancy reduces.

An object of the present invention is to provide a polycarbonate resin composition that is excellent in flowability and flame retardancy, and can provide a molded body having a high impact strength.

Solution to Problem

The inventors of the present invention have made extensive investigations, and as a result, have found that in a polycarbonate resin composition containing a PC-POS, a specific copolymer, and a flame retardant, when the resin composition satisfies a predetermined expression, the problems can be solved. Thus, the inventors have completed the present invention.

That is, the present invention relates to the following items [1] to [13].

[1] A polycarbonate resin composition, comprising: a polycarbonate resin (A) containing a polycarbonate-polyorganosiloxane copolymer (A-1) having a polycarbonate block comprising a repeating unit represented by the general formula (I) and a polyorganosiloxane block comprising a repeating unit represented by the general formula (II); a copolymer (B) having constituent units derived from acrylonitrile and styrene, and being free of a constituent unit derived from methyl methacrylate; a copolymer (C) having constituent units derived from butadiene and methyl methacrylate; and a flame retardant (D), the resin composition satisfying the expression (a):

$$(Sf-37) \times Ch/(Bd+Si) \geq 37 \qquad (a)$$

in the expression (a), Sf represents a flow length (cm) when the resin composition is molded with a spiral flow mold having a cylinder temperature of 240° C., a mold temperature of 40° C., and a thickness of 2.0 mm at a pressure setting of 125 MPa, Ch represents a Charpy impact strength (kJ/m$^2$) at a temperature of 23° C. when the resin composition is molded into a molded body having a thickness of 4 mm, Bd represents a content (mass %) of the constituent unit derived from butadiene in the resin composition, and Si represents a content (mass %) of the polyorganosiloxane block moiety in the resin composition;

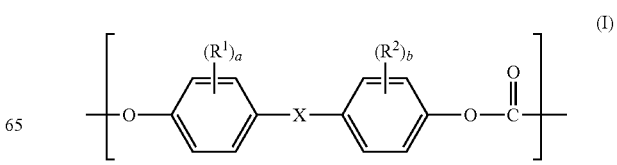

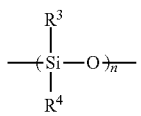

(II)

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, a and b each independently represent an integer of from 0 to 4, and n represents an average number of repetitions.

[2] The polycarbonate resin composition according to Item [1], wherein the resin composition further satisfies the expression (b), and a molded body thereof having a thickness of 1.5 mm possesses a flame retardancy satisfying a 5VB rank in accordance with UL 94 standard:

$$(Sf-37) \times Ch/(Bd+Si) - 0.05 Vh \geq 32 \qquad (b)$$

in the expression (b), Sf, Ch, Bd, and Si are the same as those in the expression (a), and Vh represents a total (seconds) of 5 combustion times in a 5V flame test of the UL94 standard, and in the flame test, the molded body is extinguished without dripping.

[3] The polycarbonate resin composition according to Item [1] or [2], wherein the component (B) contains an acrylonitrile-butadiene-styrene terpolymer (B-1).

[4] The polycarbonate resin composition according to Item [3], wherein the component (B) further contains an acrylonitrile-styrene bipolymer (B-2).

[5] The polycarbonate resin composition according to any one of Items [1] to [4], wherein the component (C) contains one or more selected from a methyl methacrylate-butadiene-styrene terpolymer and a methyl methacrylate-butadiene bipolymer.

[6] The polycarbonate resin composition according to any one of Items [3] to [5], wherein a content of a constituent unit derived from butadiene in the component (B-1) is from 8 mass % to 75 mass %.

[7] The polycarbonate resin composition according to any one of Items [4] to [6], wherein a melt volume rate (MVR) of the component (B-2) measured at a temperature of 200° C. and a load of 10 kgf is from 3 cm$^3$/10 minutes to 150 cm$^3$/10 minutes.

[8] The polycarbonate resin composition according to any one of Items [1] to [7], wherein the component (D) comprises a phosphorus-based flame retardant.

[9] The polycarbonate resin composition according to Item [8], wherein the phosphorus-based flame retardant comprises a condensed phosphate.

[10] The polycarbonate resin composition according to any one of Items [1] to [9], wherein the polycarbonate resin (A) has a viscosity-average molecular weight of from 10,000 to 30,000.

[11] The polycarbonate resin composition according to any one of Items [1] to [10], wherein the flow length Sf is 35 cm or more.

[12] The polycarbonate resin composition according to any one of Items [1] to [11], wherein the Charpy impact strength Ch is 15 kJ/m$^2$ or more.

[13] A molded body, comprising the polycarbonate resin composition of any one of Items [1] to [12].

Advantageous Effects of Invention

According to the present invention, it is possible to provide the polycarbonate resin composition that is excellent in flowability and flame retardancy, and can provide a molded body having a high impact strength.

DESCRIPTION OF EMBODIMENTS

[Polycarbonate Resin Composition]

A polycarbonate resin composition of the present invention comprises: a polycarbonate resin (A) containing a polycarbonate-polyorganosiloxane copolymer (A-1) having a polycarbonate block comprising a repeating unit represented by the following general formula (I) and a polyorganosiloxane block comprising a repeating unit represented by the following general formula (II); a copolymer (B) having constituent units derived from acrylonitrile and styrene, and being free of a constituent unit derived from methyl methacrylate; a copolymer (C) having constituent units derived from butadiene and methyl methacrylate; and a flame retardant (D), the resin composition satisfying the following expression (a).

$$(Sf-37) \times Ch/(Bd+Si) \geq 37 \qquad (a)$$

In the expression (a), Sf represents a flow length (cm) when the resin composition is molded with a spiral flow mold having a cylinder temperature of 240° C., a mold temperature of 40° C., and a thickness of 2.0 mm at a pressure setting of 125 MPa, Ch represents a Charpy impact strength (kJ/m$^2$) at a temperature of 23° C. when the resin composition is molded into a molded body having a thickness of 4 mm, Bd represents a content (mass %) of the constituent unit derived from butadiene in the resin composition, and Si represents a content (mass %) of the polyorganosiloxane block moiety in the resin composition.

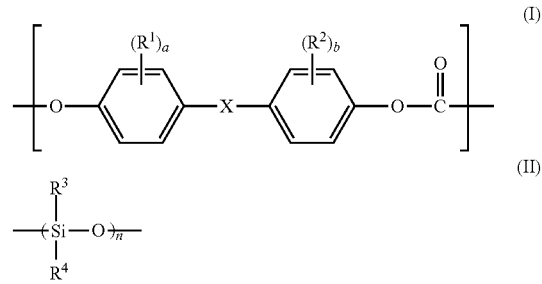

wherein, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms, a and b each independently represent an integer of from 0 to 4, and n represents an average number of repetitions.

[Polycarbonate Resin (A)]

The polycarbonate resin (A) (hereinafter sometimes referred to as "component (A)") to be used in the present invention contains the polycarbonate-polyorganosiloxane copolymer (A-1) (hereinafter sometimes referred to as "PC-POS (A-1)" or "component (A-1)"). As described later, an aromatic polycarbonate resin (A-2) except the component (A-1) may be incorporated as the component (A) to the extent that the effects of the present invention are not impaired.

<Polycarbonate-polyorganosiloxane Copolymer (A-1)>

The PC-POS (A-1) is a polycarbonate-polyorganosiloxane copolymer having a polycarbonate block formed of a repeating unit represented by the general formula (I) and a polyorganosiloxane block containing a repeating unit represented by the general formula (II).

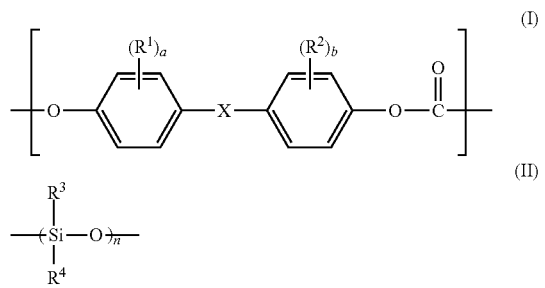

wherein, R$^1$ and R$^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, R$^3$ and R$^4$ each independently represent a hydrogen atom, a halogen atom, an alkyl group having 1 to 6 carbon atoms, an alkoxy group having 1 to 6 carbon atoms, or an aryl group having 6 to 12 carbon atoms, a and b each independently represent an integer of from 0 to 4, and n represents an average number of repetitions.]

One of the PC-POS (A-1) may be used alone, or two or more thereof may be used in combination. In addition, the number of kinds of the repeating units each represented by the general formula (I) in the PC-POS (A-1) may be only one, or may be two or more. The same holds true for the repeating unit represented by the general formula (II) in the PC-POS (A-1).

Examples of the halogen atom that R$^1$ and R$^2$ in the general formula (I) each independently represent include a fluorine atom, a chlorine atom, a bromine atom, and an iodine atom.

Examples of the alkyl group that R$^1$ and R$^2$ each independently represent include a methyl group, an ethyl group, a n-propyl group, an isopropyl group, various butyl groups ("various" means that a linear group and any branched group are included, and the same shall apply hereinafter), various pentyl groups, and various hexyl groups. An example of the alkoxy group that R$^1$ and R$^2$ each independently represent is an alkoxy group whose alkyl group moiety is the alkyl group described above.

R$^1$ and R$^2$ each preferably represent an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group, and an alkylene group having 1 to 5 carbon atoms is preferred. Examples of the alkylidene group represented by X include an ethylidene group and an isopropylidene group. The cycloalkylene group represented by X is preferably a cycloalkylene group having 5 to 10 carbon atoms, and examples thereof include a cyclopentanediyl group, a cyclohexanediyl group, and a cyclooctanediyl group. Examples of the cycloalkylidene group represented by X include a cyclohexylidene group, a 3,5,5-trimethylcyclohexylidene group, and a 2-adamantylidene group, a cycloalkyl idene group having 5 to 10 carbon atoms is preferred, and a cycloalkylidene group having 5 to 8 carbon atoms is more preferred. As an aryl moiety of the arylalkylene group represented by X, there are given, for example, aryl groups each having 6 to 14 ring-forming carbon atoms, such as a phenyl group, a naphthyl group, a biphenyl group, and an anthryl group. As an aryl moiety of the arylalkylidene group represented by X, there are given, for example, aryl groups each having 6 to 14 ring-forming carbon atoms, such as a phenyl group, a naphthyl group, a biphenyl group, and an anthryl group.

a and b each independently represent an integer of from 0 to 4, preferably from 0 to 2, more preferably 0 or 1.

Examples of the halogen atom that R$^3$ and R$^4$ in the general formula (II) each independently represent include a fluorine atom, a chlorine atom, a bromine atom, and an iodine atom. Examples of the alkyl group or alkoxy group that R$^3$ and R$^4$ each independently represent include the same examples as those in the cases of R$^1$ and R$^2$. Examples of the aryl group that R$^3$ and R$^4$ each independently represent include a phenyl group and a naphthyl group.

R$^3$ and R$^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

In the general formula (II), n represents an average number of repetitions, and represents an integer of preferably from 30 to 500, more preferably from 30 to 150, still more preferably from 30 to 120. When the average number n of repetitions is 30 or more, the impact resistance become sufficient. When the average number n of repetitions is 500 or less, the following situation is easily avoided: handling at the time of the production of the copolymer becomes difficult owing to an excessive increase in viscosity of the raw material POS.

The structure of the polyorganosiloxane block containing a repeating structure represented by the general formula (II) is preferably a structure represented by the following general formula (II').

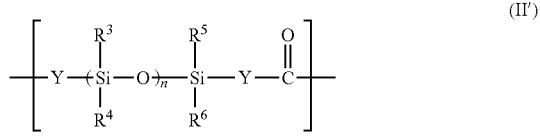

(II')

In the formula (II'), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or a divalent organic residue containing —C(=O)—, an aliphatic group, or an aromatic group, and n represents an average number of repetitions.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. Y preferably represents a residue of a phenol-based compound having an alkyl group, and more preferably represents an organic residue derived from allylphenol or an organic residue derived from eugenol.

In addition, it is also preferred that the structure of the polyorganosiloxane block containing a repeating structure represented by the general formula (II) be a structure represented by the following formula (II").

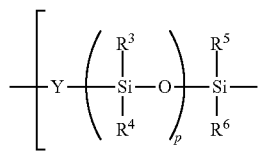 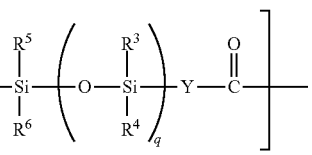

(II")

In the formula (II"), $R^3$ to $R^6$ and Y are identical to those in the general formula (II'), and preferred examples thereof are also the same as those in the formula. The sum of p and q equals n. Each of p and q preferably equals n/2.

m represents 0 or 1.

Z' represents a single bond, —$R^7$O—, —$R^7$COO—, —COO—, or —S—, and the $R^7$ represents a linear, branched, or cyclic alkylene group, an aryl-substituted alkylene group that may have an alkoxy group on an aromatic ring thereof, an arylene group, or a diarylene group. Specific examples of the $R^7$ are described later.

In addition, β represents a divalent group derived from a diisocyanate compound, a divalent group derived from a dicarboxylic acid, or a divalent group derived from a dicarboxylic acid halide. Specific examples of the divalent group derived from a di isocyanate compound, the divalent group derived from a dicarboxylic acid, and the divalent group derived from a dicarboxylic acid halide are described later.

The content of the polyorganosiloxane block moiety containing the repeating unit represented by the general formula (II) in the PC-POS (A-1) is preferably from 2.0 mass % to 15 mass %, more preferably from 3.0 mass % to 8.5 mass %, still more preferably from 3.2 mass % to 7.5 mass %. When the content is 2.0 mass % or more, the impact resistance of the resin composition to be obtained becomes more satisfactory. In addition, when the content is 15 mass % or less, handleability at the time of the production of the PC-POS (A-1) becomes easier. The content of the polyorganosiloxane block moiety in the component (A-1) can be calculated by nuclear magnetic resonance (NMR).

The viscosity-average molecular weight (Mv) of the PC-POS (A-1) is preferably from 10,000 to 25,000, more preferably from 12,000 to 23,000. When the viscosity-average molecular weight of the component (A-1) falls within the range, it is easy to balance the flowability with impact resistance of the resin composition.

In the present invention, the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C. with an Ubbelohde-type viscosity tube.

A method of producing the PC-POS (A-1) is not particularly limited, and the PC-POS can be easily produced with reference to a known production method for a PC-POS, e.g., a method described in JP 2010-241943 A.

Specifically, the PC-POS can be produced by: dissolving an aromatic polycarbonate oligomer produced in advance and a polyorganosiloxane having a reactive group at a terminal thereof (such as a polyorganosiloxane represented by the following general formula (2) or (3)) in a water-insoluble organic solvent (such as methylene chloride); adding an aqueous solution of a dihydric phenol represented by the following general formula (1) (such as bisphenol A) in an aqueous solution of alkaline compound (such as aqueous sodium hydroxide) to the solution; and subjecting the mixture to an interfacial polycondensation reaction, in the presence of polymerization catalyst such as a tertiary amine (such as triethylamine) or a quaternary ammonium salt (such as trimethylbenzylammonium chloride), and a molecular weight modifier (terminal stopper) (a monohydric phenol such as p-t-butylphenol). The content of the polyorganosiloxane block moiety containing the repeating unit represented by the general formula (II) in the PC-POS (A-1) component can be adjusted by, for example, adjusting the usage amount of the polyorganosiloxane.

After the interfacial polycondensation reaction, the resultant is appropriately left at rest to be separated into an aqueous phase and a water-insoluble organic solvent phase [separating step], the water-insoluble organic solvent phase is washed (preferably washed with a basic aqueous solution, an acidic aqueous solution, and water in the stated order) [washing step], and the resultant organic phase is concentrated [concentrating step], pulverized [pulverizing step], and dried [drying step]. Thus, the PC-POS can be obtained. The content of the polyorganosiloxane block moiety in the component (A) can be adjusted by adjusting a usage ratio between the PC-POS (A-1) component whose polyorganosiloxane block content has been adjusted and the polycarbonate resin (A) formed of the aromatic polycarbonate resin (A-2) except the component (A-1).

In addition, the PC-POS can be produced by copolymerizing a dihydric phenol represented by the following general formula (1), a polyorganosiloxane represented by the following general formula (2), and phosgene, a carbonate, or a chloroformate.

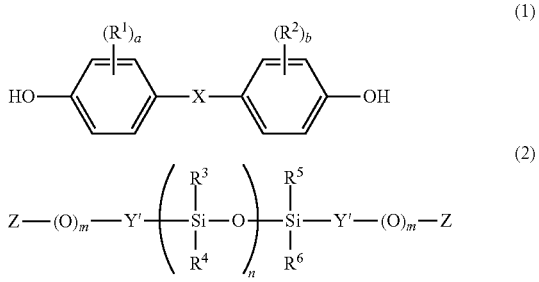

(1)

$$Z-(O)_m-Y'-\left(\begin{array}{c}R^3\\|\\Si-O\\|\\R^4\end{array}\right)_n\begin{array}{c}R^5\\|\\Si\\|\\R^6\end{array}-Y'-(O)_m-Z$$

(2)

Here, in the general formula (1), $R^1$ and $R^2$, X, a, and b are the same as those in the general formula (I), and in the general formula (2), $R^3$ to $R^6$ are the same as those in the general formula (II'), n is the same as that in the general formula (II), and Y' is the same as Y in the general formula (II').

m represents 0 or 1, Z represents a halogen atom, $-R^7OH$, $-R^7COOH$, $-R^7NH_2$, $-R^7NHR^7$, $-COOH$, or $-SH$, $R^7$ represents a linear, branched, or cyclic alkylene group, an aryl-substituted alkylene group that may have an alkoxy group on an aromatic ring thereof, an arylene group, or a diarylene group, and $R^8$ represents an alkyl group, an alkenyl group, an aryl group, an aralkyl group, or an alkoxy group.

The diarylene group refers to a group obtained by linking two arylene groups directly or through a divalent organic group, and is specifically a group having a structure represented by $-Ar^1-W-Ar^2-$. Here, $Ar^1$ and $Ar^2$ each represent an arylene group, and W represents a single bond or a divalent organic group. Specific examples and suitable examples of W are the same as those of X in the general formula (I).

An example of the linear or branched alkylene group represented by $R^7$ is an alkylene group having 1 to 8 carbon atoms, preferably 1 to 5 carbon atoms. An example of the cyclic alkylene group is a cycloalkylene group having 5 to 15 carbon atoms, preferably 5 to 10 carbon atoms. An example of the alkylene moiety of the aryl-substituted alkylene group represented by $R^7$ is an alkylene group having 1 to 8 carbon atoms, preferably 1 to 5 carbon atoms. Examples of the aryl moiety of the aryl-substituted alkylene group represented by $R^7$ include aryl groups each having 6 to 14 ring-forming carbon atoms, such as a phenyl group, a naphthyl group, a biphenyl group, and an anthryl group. Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group.

Y' preferably represents a single bond, or a divalent organic residue containing $-C(=O)-$, an aliphatic group, or an aromatic group, and being bonded to Si and O or to Si and Z. $R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. n is the same as above, and m represents 0 or 1.

Z preferably represents $-R^7OH$, $-R^7COOH$, $-R^7NH_2$, $-COOH$, or $-SH$. The $R^7$ is as defined above, and preferred examples thereof are also the same as those of above.

$R^8$ preferably represents an alkyl group, an alkenyl group, an aryl group, or an aralkyl group.

The dihydric phenol represented by the general formula (1) serving as a raw material for the PC-POS is not particularly limited, but is suitably 2,2-bis(4-hydroxyphenyl)propane [trivial name: bisphenol A]. When bisphenol A is used as the dihydric phenol, in the resultant PC-POS, X represents an isopropylidene group and a=b=0 in the general formula (I).

Examples of the dihydric phenol except bisphenol A include: bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes, such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers, such as 4,4'-dihydroxydiphenyl ether and 4,4'-dihydroxy-3,3'-dimethylphenyl ether; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide and 4,4'-dihydroxy-3,3'-dimethyldiphenyl sulfoxide; dihydroxydiaryl sulfones, such as 4,4'-dihydroxydiphenyl sulfone and 4,4'-dihydroxy-3,3'-dimethyldiphenyl sulfone; dihydroxydiphenyls, such as 4,4'-dihydroxydiphenyl; dihydroxydiarylfluorenes, such as 9,9-bis(4-hydroxyphenyl)fluorene and 9,9-bis(4-hydroxy-3-methylphenyl)fluorene; dihydroxydiaryladamantanes, such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene.

One of those dihydric phenols may be used alone, or two or more thereof may be used as a mixture.

The polyorganosiloxane represented by the general formula (2) can be easily produced by subjecting a phenol having an olefinically unsaturated carbon-carbon bond (preferably vinylphenol, allylphenol, eugenol, isopropenylphenol, or the like) to a hydrosilylation reaction with a terminal of a polyorganosiloxane chain having a predetermined polymerization degree (n; number of repetitions). The phenol is more preferably allylphenol or eugenol.

The polyorganosiloxane represented by the general formula (2) is preferably one in which $R^3$ to $R^6$ each represent a methyl group.

Examples of the polyorganosiloxane represented by the general formula (2) include compounds represented by the following general formulae (2-1) to (2-10).

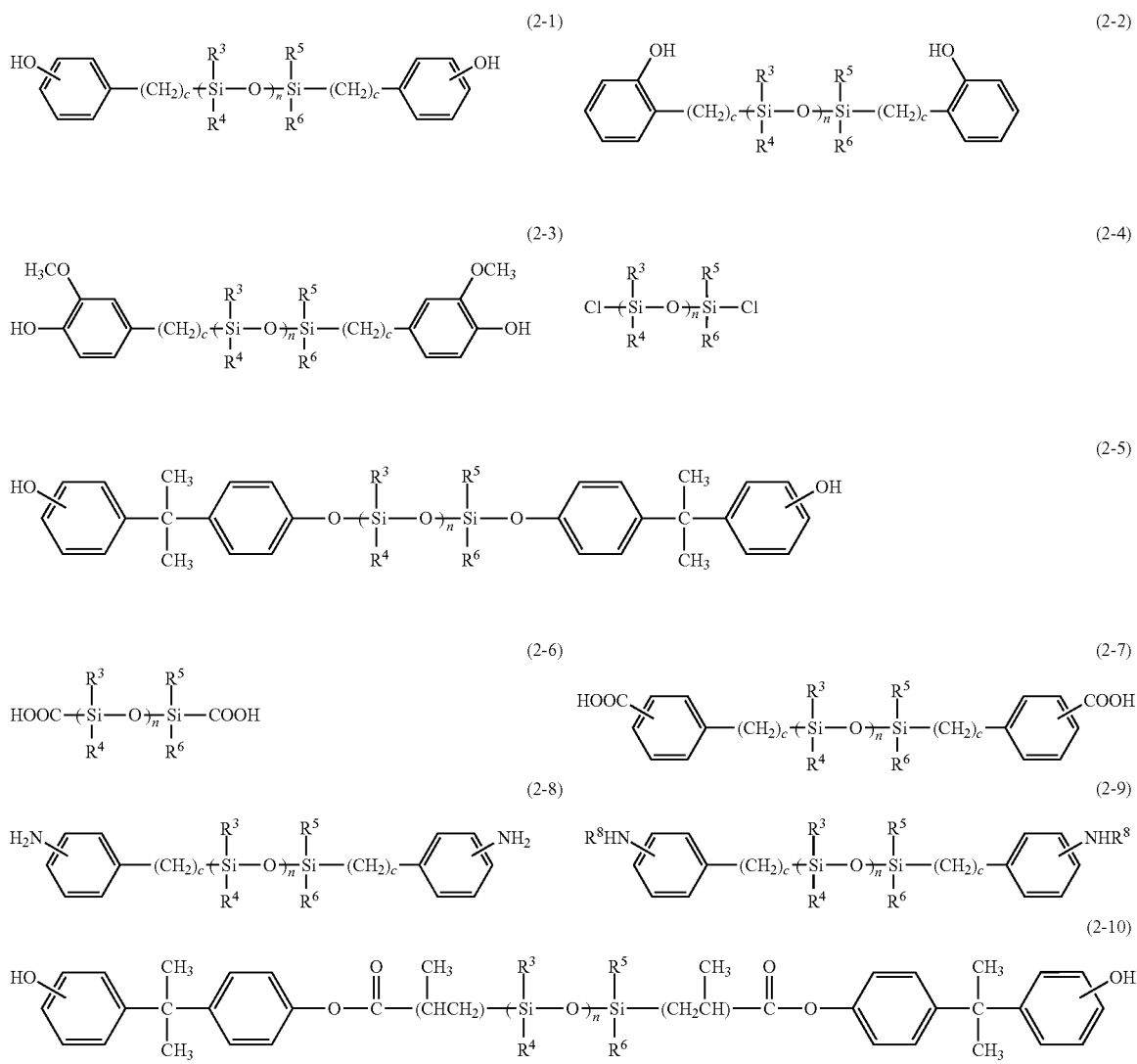

In the general formulae (2-1) to (2-10), $R^3$ to $R^6$, n, and $R^8$ are as defined above, and preferred examples thereof are also the same as those of above. c represents a positive integer and typically represents an integer of from 1 to 6.

Among them, a phenol-modified polyorganosiloxane represented by the general formula (2-1) is preferred from the viewpoint of its ease of polymerization. In addition, an α,ω-bis[3-(o-hydroxyphenyl)propyl]polydimethylsiloxane, which is one of compound represented by the general formula (2-2), or an α,ω-bis[3-(4-hydroxy-3-methoxyphenyl)propyl]polydimethylsiloxane, which is one of compound represented by the general formula (2-3), is preferred from the viewpoint of its ease of availability.

The phenol-modified polyorganosiloxane can be produced by a known method. For example, the following method is given as the production method.

First, cyclotrisiloxane and disiloxane are caused to react with each other in the presence of an acid catalyst to synthesize an α,ω-dihydrogen organopolysiloxane. At this time, an α,ω-dihydrogenpolyorganosiloxane having a desired average number of repetitions can be synthesized by changing a blending ratio between cyclotrisiloxane and disiloxane. Then, the α,ω-dihydrogen polyorganosiloxane is subjected to an addition reaction with a phenol compound having an unsaturated aliphatic hydrocarbon group, such as allylphenol or eugenol, in the presence of a catalyst for a hydrosilylation reaction, whereby a phenol-modified polyorganosiloxane having a desired average number of repetitions can be produced.

In addition, at this stage, a cyclicpolyorganosiloxane having a low molecular weight and an excessive amount of the phenol compound remain as impurities. Accordingly, those low-molecular weight compounds are preferably removed by distillation with heating under reduced pressure.

Further, the PC-POS may be a copolymer produced by copolymerizing the dihydric phenol represented by the general formula (1), a polyorganosiloxane represented by the following general formula (3), and phosgene, a carbonate, or a chloroformate. The polyorganosiloxane represented by the general formula (3) is a product of a reaction between the polyorganosiloxane represented by the general formula (2) and a diisocyanate compound, a dicarboxylic acid, or a dicarboxylic acid halide.

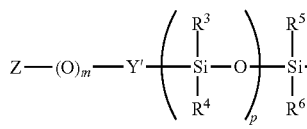 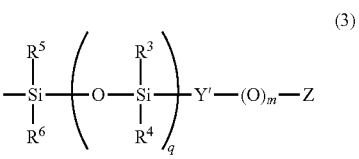

(3)

In the general formula (3), $R^3$ to $R^6$, m, p, q, Y', Z, and Z' are as defined above, and preferred examples thereof are also the same as those of above. p=q, i.e., p=n/2 and q=n/2 can be given as preferred examples of p and q in the general formula (3).

In addition, β represents a divalent group derived from a diisocyanate compound, a divalent group derived from a dicarboxylic acid, or a divalent group derived from a dicarboxylic acid halide, and examples thereof include divalent groups represented by the following general formulae (3-1) to (3-5).

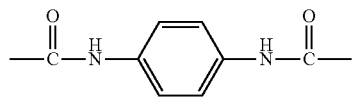

(3-1)

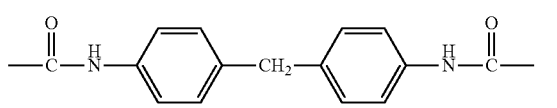

(3-2)

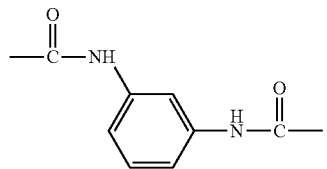

(3-3)

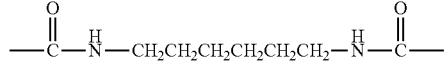

(3-4)

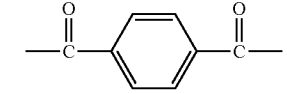

(3-5)

As described above, the aromatic polycarbonate resin (A-2) (hereinafter sometimes referred to as "component (A-2)") except the component (A-1) may be incorporated as the component (A) to the extent that the effects of the present invention are not impaired. The component (A-2) is obtained by using an aromatic dihydric phenol-based compound, and can be used for adjusting the content of the polyorganosiloxane block moiety containing the repeating unit represented by the general formula (II) in the component (A).

The viscosity-average molecular weight of the aromatic polycarbonate resin serving as the component (A-2) is preferably from 10,000 to 40,000, more preferably from 13,000 to 30,000 in terms of physical properties.

The aromatic polycarbonate resin (A-2) is free of a repeating structure represented by the general formula (II), and its main chain is preferably formed of a repeating unit represented by the following general formula (III). Such aromatic polycarbonate resin is not particularly limited, and any one of the various known aromatic polycarbonate resins can be used.

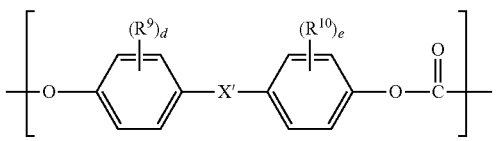

(III)

wherein, $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.]

Specific examples of $R^9$ and $R^{10}$ include the same examples as those of $R^1$ and $R^2$, and preferred examples thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferred examples thereof are also the same as those of X. d and e each independently represent preferably from 0 to 2, more preferably 0 or 1.

Specifically, a resin obtained by a conventional production method for an aromatic polycarbonate can be used as the aromatic polycarbonate resin. Examples of the conventional method include: an interfacial polymerization method involving causing the aromatic dihydric phenol-based compound and phosgene to react with each other in the presence of an organic solvent inert to the reaction and an aqueous alkaline solution, adding a polymerization catalyst, such as a tertiary amine or a quaternary ammonium salt, to the resultant, and polymerizing the mixture; and a pyridine method involving dissolving the aromatic dihydric phenol-based compound in pyridine or a mixed solution of pyridine and an inert solvent, and introducing phosgene to the solution to directly produce the resin.

A molecular weight modifier (terminal stopper), a branching agent, or the like is used as required at the time of the reaction.

The aromatic dihydric phenol-based compound is, for example, a compound represented by the following general formula (III').

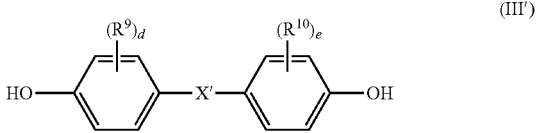

(III')

wherein, $R^9$, $R^{10}$, X', d, and e are as defined above, and preferred examples thereof are also the same as those of above.

Specific examples of the aromatic dihydric phenol-based compound include bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone.

Among them, bis(hydroxyphenyl)alkane-based dihydric phenols are preferred, and bisphenol A is more preferred.

One of the aromatic polycarbonate resins (A-2) may be used alone, or two or more thereof may be used in combination.

The viscosity-average molecular weight (Mv) of the polycarbonate resin (A) is preferably from 10,000 to 30,000, more preferably from 12,000 to 26,000. When the viscosity-average molecular weight of the component (A) falls within the range, the balance between the flowability and the impact resistance is more excellent.

The content of the polyorganosiloxane block moiety containing the repeating unit represented by the general formula (II) in the polycarbonate resin (A) is preferably from 0.75 mass % to 15 mass %, more preferably from 0.75 mass % to 10 mass %, still more preferably from 0.80 mass % to 6.0 mass %. When the content is 0.75 mass % or more, an improving effect on the impact strength of the resin composition becomes higher, and when the content is 15 mass % or less, a reduction in impact strength thereof is easily avoided.

Here, the content of the polyorganosiloxane block moiety in the component (A) can be calculated by nuclear magnetic resonance (NMR).

The content of the component (A-1) in the component (A) is preferably from 10 mass % to 100 mass %, more preferably from 15 mass % to 100 mass %, still more preferably from 20 mass % to 100 mass % from the viewpoint that the content of the polyorganosiloxane block moiety in the component (A) is preferably adjusted to fall within the above-mentioned range.

The case where the content of the component (A-1) is 10 mass % or more is preferred in terms of the production of the PC-POS because there is no need to increase the content of the polyorganosiloxane block moiety in the component (A-1).

[Copolymer (B)]

The polycarbonate resin composition of the present invention contains, as the component (B), the copolymer having the constituent units derived from acrylonitrile and styrene, and being free of any constituent unit derived from methyl methacrylate. When the polycarbonate resin composition contains the component (B), the resin composition is excellent in flowability. In addition, the component has the constituent unit derived from acrylonitrile and hence a resin composition having satisfactory compatibility with the component (A) can be obtained.

Examples of the component (B) include an acrylonitrile-styrene bipolymer (AS) and a copolymer that is ternary or more, the copolymer being obtained by further copolymerizing any other component with acrylonitrile and styrene.

Specific examples of the other component include polybutadiene, a (meth)acrylic acid ester (except methyl methacrylate), styrene-butadiene-styrene rubber (SBS), styrene-butadiene rubber (SBR), butadiene-acrylic rubber, isoprene rubber, isoprene-styrene rubber, isoprene-acrylic rubber, ethylene-propylene rubber, and ethylene-propylene-diene rubber. Among them, polybutadiene is particularly preferred. As the polybutadiene to be used in this case, any one of the following polybutadienes may be used, or a mixture thereof may be used: low cis polybutadiene (such as polybutadiene containing 1 mol % to 30 mol % of a 1,2-vinyl bond and 30 mol % to 42 mol % of a 1,4-cis bond) and high cis polybutadiene (such as polybutadiene containing 20 mol % or less of a 1,2-vinyl bond and 78 mol % or more of a 1,4-cis bond).

Specific examples of the copolymer that is ternary or more include an acrylonitrile-acrylate-styrene terpolymer (AAS), an acrylonitrile-butadiene-styrene terpolymer (ABS) obtained by polymerizing polybutadiene with acrylonitrile and styrene, and an acrylonitrile-(ethylene/propylene/diene copolymer)-styrene copolymer (AES).

One of the copolymers may be used alone, or two or more thereof may be used in combination.

Among the copolymers, the component (B) preferably contains at least an acrylonitrile-butadiene-styrene terpolymer (B-1) (hereinafter sometimes referred to as "component (B-1)") in terms of an improvement in flowability of the resin composition and an improvement in impact resistance thereof by the incorporation of a rubber component. In addition, the component may further contain an acrylonitrile-styrene bipolymer (B-2) (hereinafter sometimes referred to as "component (B-2)") in terms of the improvement in flowability.

The content of a constituent unit derived from butadiene in the component (B-1) is preferably from 8 mass % to 75 mass %, more preferably from 30 mass % to 70 mass %, still more preferably from 50 mass % to 70 mass %. When the content of the constituent unit derived from butadiene in the component (B-1) is 8 mass % or more, the impact resistance of a molded body is further improved.

The melt volume rate (MVR) of the component (B-2) measured at a temperature of 200° C. and a load of 10 kgf is preferably from 3 $cm^3$/10 min to 150 $cm^3$/10 min. When the MVR of the component (B-2) falls within the range, the flowability of the resin composition is further improved. In particular, when a component in which the content of the constituent unit derived from butadiene is from 30 mass % to 70 mass % is used as the component (B-1), the MVR of the component (B-2) to be used is more preferably from 50 $cm^3$/10 min to 150 $cm^3$/10 min from the viewpoint of an improvement in flowability of the resin composition.

The MVR can be measured by a method in conformity with ISO 1133.

As a commercial product of the ABS serving as the component (B-1), there may be given, for example, SANTAC AT-05 and KRALASTIC SXH-330 (each of which is manufactured by Nippon A&L Inc.), TOYOLAC 500 or 700 (manufactured by Toray Industries, Inc.), RA-756 (manufactured by Chi Mei Corporation), and HR181 (manufactured by Kumho Petrochemical Co., Ltd.). In addition, as a commercial product of the AS serving as the component (B-2), there may be given, for example, 290FF (manufactured by Techno Polymer Co., Ltd.), S100N, S200N, and S101N (manufactured by UMG ABS, Ltd.), and PN-117C (manufactured by Chi Mei Corporation).

[Copolymer (C)]

The polycarbonate resin composition of the present invention contains, as the component (C), the copolymer having the constituent units derived from butadiene and methyl methacrylate. The incorporation of the component (C) can provide a resin composition particularly excellent in impact resistance.

Examples of the component (C) include a methyl methacrylate-butadiene-styrene terpolymer (MBS) obtained by polymerizing polybutadiene with methyl methacrylate and styrene, a methyl methacrylate-acrylonitrile-butadiene-styrene quaterpolymer (MABS), and a methyl methacrylate-butadiene bipolymer (MB).

One of the copolymers may be used alone, or two or more thereof may be used in combination. The component (C) preferably contains one or more selected from a methyl methacrylate-butadiene-styrene terpolymer and a methyl methacrylate-butadiene bipolymer among them in terms of an improvement in impact resistance of the resin composition.

As a commercial product of the MBS, there may be given, for example, METABLEN C223A (manufactured by Mitsubishi Rayon Co., Ltd.), DENKA TH Polymer (manufactured by Denka Company Limited), KANE ACE B (manufactured by Kaneka Corporation), and PARALOID EXL2620 (manufactured by The Dow Chemical Company). As a commercial product of the MABS, there may be given, for example, DENKA CL Polymer, DENKA TE Polymer, and DENKA TP Polymer (all of which are manufactured by Denka Company Limited.). As a commercial product of the MB, there may be given, for example, KANE ACE M-711 (manufactured by Kaneka Corporation) and PARALOID EXL2603 and PARALOID EXL2690 (each of which is manufactured by The Dow Chemical Company).

Here, in the polycarbonate resin composition of the present invention, preferred contents of the component (B-1), the component (B-2), and the component (C) with respect to 100 parts by mass of the component (A) are as described below. When the contents of the respective components fall within the following ranges, the balance between the flowability and the impact resistance becomes more satisfactory.

In the polycarbonate resin composition of the present invention, it is preferred that the content of the component (B-1) be from 8 parts by mass to 100 parts by mass, the content of the component (B-2) be 25 parts by mass or less, and the content of the component (C) be from 0.5 part by mass to 8 parts by mass with respect to 100 parts by mass of the component (A). It is more preferred that the content of the component (B-1) be from 8 parts by mass to 50 parts by mass, the content of the component (B-2) be from 1 part by mass to 20 parts by mass, and the content of the component (C) be from 1 part by mass to 5 parts by mass. In addition, when the content of the constituent unit derived from butadiene in the component (B-1) is from 30 mass % to 70 mass %, the contents are preferably as follows: the content of the component (B-1) is from 8 parts by mass to 15 parts by mass, the content of the component (B-2) is from 10 parts by mass to 25 parts by mass, and the content of the component (C) is from 1 part by mass to 5 parts by mass with respect to 100 parts by mass of the component (A).

In the polycarbonate resin composition of the present invention, the content of the polyorganosiloxane block moiety containing the repeating unit represented by the general formula (II) is preferably from 0.50 mass % to 10 mass %, more preferably from 0.60 mass % to 8.0 mass %, still more preferably from 0.70 mass % to 5.0 mass % in the entire resin composition.

In the case where the content is 0.50 mass % or more, the impact strength of a molded body to be obtained becomes higher. In addition, the case where the content is 10 mass % or less is preferred in terms of economic efficiency.

Here, the content of the polyorganosiloxane block moiety in the resin composition is a value calculated by nuclear magnetic resonance (NMR) measurement.

In addition, the polycarbonate resin composition of the present invention is such that the content of the constituent unit derived from butadiene in the entire composition is preferably from 3 mass % to 10 mass %. When the content of the constituent unit derived from butadiene is 3 mass % or more, the impact resistance of the molded body becomes higher, and when the content is 10 mass % or less, reductions in flowability and flame retardancy thereof are easily suppressed. From the above viewpoints, the polycarbonate resin composition of the present invention is such that the content of the constituent unit derived from butadiene in the entire resin composition is more preferably from 3 mass % to 8 mass %, still more preferably from 3.5 mass % to 6 mass %.

Further, the polycarbonate resin composition of the present invention is such that the content of the constituent unit derived from styrene in the entire resin composition is preferably from 5 mass % to 35 mass %, and the content of the constituent unit derived from acrylonitrile therein is preferably from 3 mass % to 10 mass %.

When the content of the constituent unit derived from styrene is 5 mass % or more, the flowability becomes more satisfactory, and when the content is 35 mass % or less, a reduction in impact resistance of the molded body is easily avoided. In addition, when the content of the constituent unit derived from acrylonitrile is 3 mass % or more, the compatibility with the component (A) becomes more satisfactory, and when the content is 10 mass % or less, the reduction in impact resistance of the molded body is easily avoided.

From the above viewpoints, in the polycarbonate resin composition of the present invention, the content of the constituent unit derived from styrene is more preferably from 7 mass % to 20 mass %, still more preferably from 8 mass % to 15 mass %. In addition, the content of the constituent unit derived from acrylonitrile is more preferably from 3 mass % to 8 mass %, still more preferably from 3 mass % to 6 mass %.

In the polycarbonate resin composition of the present invention, the total content of the polyorganosiloxane block moiety containing the repeating unit represented by the general formula (II) and the constituent unit derived from butadiene is preferably from 3.5 mass % to 15 mass %, more preferably from 4.0 mass % to 10 mass %. Each of the polyorganosiloxane block moiety and the constituent unit derived from butadiene improves the impact resistance of the resin composition. Accordingly, when the total content is 3.5 mass % or more, higher impact resistance can be obtained. In addition, when the total content is 15 mass % or less, a reduction in flowability thereof can be further suppressed.

[Flame Retardant (D)]

The polycarbonate resin composition of the present invention further contains, as the component (D), the flame retardant.

The flame retardant is not particularly limited as long as the flame retardant has an improving effect on the flame retardancy of the resin composition within the scope of the effects of the present invention, and examples thereof include various known flame retardants, such as a halogen-based flame retardant, a phosphorus-based flame retardant, and a metal salt-based flame retardant. Among those various known flame retardants, a phosphorus-based flame retardant is preferably used as the component (D) from the viewpoint that high flame retardancy is imparted to the resin composition.

Examples of the phosphorus-based flame retardant include red phosphorus- and phosphate-based flame retardants.

In particular, the phosphate-based flame retardant is preferably a halogen-free flame retardant. An example thereof is a halogen-free flame retardant formed of a monomer, an oligomer, or a polymer of a phosphate or a mixture thereof. Specific examples thereof include trimethyl phosphate, triethyl phosphate, tributyl phosphate, trioctylphosphate, tributoxyethyl phosphate, triphenyl phosphate, tricresyl phosphate, cresyl diphenyl phosphate, octyl diphenyl phosphate, tri(2-ethylhexyl)phosphate, diisopropyl phenyl phosphate, trixylenyl phosphate, tris(isopropylphenyl) phosphate, trinaphthyl phosphate, bisphenol A bisphosphate, hydroquinone bisphosphate, resorcin bisphosphate, resorcinol-diphenyl phosphate, and trioxybenzene triphosphate as well as substituted products and condensed products thereof. Among them, a condensed phosphate is preferably used.

As a commercial phosphate compound that may be suitably used as the phosphate-based flame retardant, there may be given, for example, TPP [triphenyl phosphate], TXP [trixylenyl phosphate], CR733S [resorcinol bis(diphenyl phosphate)], CR741 [bisphenol A bis(diphenyl phosphate)], PX200 [1,3-phenylene-tetrakis(2,6-dimethylphenyl) phosphate], PX201L [1,4-phenylene-tetrakis(2,6-dimethylphenyl) phosphate], and PX202 [4,4'-biphenylene-tetrakis(2,6-dimethylphenyl) phosphate] manufactured by Daihachi Chemical Industry Co., Ltd.

The phosphate-based flame retardant is obtained by a reaction among a dihydric phenol, a monohydric phenol represented by Ar.OH, and phosphorus oxychloride.

One of those flame retardants may be used alone, or two or more thereof may be used in combination.

The content of the component (D) in the polycarbonate resin composition of the present invention is preferably from 10 parts by mass to 40 parts by mass, more preferably from 10 parts by mass to 30 parts by mass, still more preferably from 15 parts by mass to 30 parts by mass with respect to 100 parts by mass of the component (A). When the content is 10 parts by mass or more, more satisfactory flame retardancy is obtained and the flowability of the resin composition is further improved. In addition, when the content is 40 parts by mass or less, the impact resistance and heat resistance of the resin composition are easily maintained.

[Other Component]

Any other component can be appropriately incorporated into the polycarbonate resin composition of the present invention to the extent that the effects of the present invention are not remarkably impaired.

Examples of the other component include additives such as an antioxidant, a UV absorber, a release agent, a flame retardant aid, an inorganic filler, and a colorant (a dye or a pigment).

Examples of the antioxidant include a phosphorus-based antioxidant, a sulfur-based antioxidant, and a phenol-based antioxidant.

The phosphorus-based antioxidant is not particularly limited. Typical examples thereof include tris(nonylphenyl) phosphite and 2-ethylhexyl diphenyl phosphite as well as a trialkyl phosphite, a tricycloalkyl phosphite, a triaryl phosphite, a trialkyl phosphate, a tricycloalkyl phosphate, and a triaryl phosphate. Among them, a triaryl phosphite or a triaryl phosphate is suitably used.

The sulfur-based antioxidant is not particularly limited, and is preferably pentaerythritol tetrakis(3-laurylthiopropionate) or tetrakis[methylene-3-(dodecylthio)propionate] methane.

The phenol-based antioxidant is not particularly limited. Hindered phenol-based antioxidants are suitably used. Among them, octadecyl 3-(3,5-di-tert-butyl-4-hydroxyphenyl)propionate, pentaerythritol-tetrakis[3-(3,5-di-t-butyl-4-hydroxyphenyl)propionate], 1,6-hexanediol-bis[3-(3,5-di-tert-butyl-4-hydroxyphenyl)propionate], 1,3,5-trimethyl-2,4,6-tris(3,5-di-tert-butyl-4-hydroxybenzyl)benzene, or the like is preferred.

In the present invention, when any of the antioxidants is used, one thereof may be used alone, or two or more thereof may be used in combination. The phosphorus-based antioxidant is preferably used as the antioxidant. It is more preferred that the phosphorus-based antioxidant be used alone, or the phosphorus-based antioxidant and the sulfur-based antioxidant and/or the phenol-based antioxidant be used in combination.

The blending amount of the antioxidant is preferably from 0.001 part by mass to 5 parts by mass, more preferably from 0.005 part by mass to 3 parts by mass, still more preferably from 0.01 part by mass to 1 part by mass with respect to 100 parts by mass of the component (A). When the blending amount of the antioxidant falls within the range, the discoloration of the resin composition and a reduction in molecular weight thereof at the time of its molding can be sufficiently prevented, and its antioxidant effect can be improved.

For example, the following UV absorber may be used: a benzophenone-based, benzotriazole-based, hydroxyphenyltriazine-based, cyclic imino ester-based, or cyanoacrylate-based UV absorber. One of the UV absorbers may be used alone, or two or more thereof may be used in combination. As the UV absorber, at least one selected from a benzophenone-based UV absorber and a benzotriazole-based UV absorber is preferably used, and a benzotriazole-based UV absorber is more preferably used.

Examples of the benzophenone-based UV absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxy trihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl) methane, 2-hydroxy-4-n-dodecyloxybenzophenone, and 2-hydroxy-4-methoxy-2'-carboxybenzophenone.

Examples of the benzotriazole-based UV absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimidemethyl)-5-methylphenyl]

benzotriazole as well as polymers each having a 2-hydroxyphenyl-2H-benzotriazole skeleton, such as a copolymer of 2-(2'-hydroxy-5-methacryloxyethylphenyl)-2H-benzotriazole and a vinyl-based monomer copolymerizable with the monomer and a copolymer of 2-(2'-hydroxy-5-acryloxyethylphenyl)-2H-benzotriazole and a vinyl-based monomer copolymerizable with the monomer.

The blending amount of the UV absorber in the polycarbonate resin composition of the present invention is preferably from 0.001 part by mass to 1 part by mass, more preferably from 0.005 part by mass to 0.7 part by mass, still more preferably from 0.01 part by mass to 0.5 part by mass with respect to 100 parts by mass of the component (A). In the case where the blending amount of the UV absorber is 0.001 part by mass or more, the occurrence of the coloring of the molded body, such as yellowing, can be sufficiently suppressed. In addition, the case where the blending amount is 1 part by mass or less is preferred in terms of economic efficiency, and in this case, the contamination of a mold does not occur at the time of the molding of the resin composition.

For example, a fatty acid ester, polyolefin-based wax, fluorine oil, or paraffin wax may be used as the release agent. Among them, a fatty acid ester is preferred, and preferred examples thereof include: partial esters, such as stearic acid monoglyceride, stearic acid diglyceride, stearic acid monosorbitate, behenic acid monoglyceride, pentaerythritol monostearate, pentaerythritol distearate, propylene glycol monostearate, sorbitan monostearate, and glycerin monostearate; and pentaerythritol tetrastearate. One of those release agents may be used alone, or two or more thereof may be used in combination.

The blending amount of the release agent in the polycarbonate resin composition of the present invention is preferably from 0.01 part by mass to 3 parts by mass, more preferably from 0.1 part by mass to 2 parts by mass, still more preferably from 0.2 part by mass to 2 parts by mass with respect to 100 parts by mass of the component (A).

The flame retardant aid is used in combination with the flame retardant (D), and a polytetrafluoroethylene (PTFE) or an antimony oxide compound can be used as the aid. Among them, a PTFE is preferably used and a PTFE having a fibril-forming ability is desirably used.

Mixed powder formed of PTFE particles and organic polymer particles is also desirably used.

As a monomer for producing the organic polymer particles, there may be specifically given, for example: a styrene-based monomer; an alkyl (meth)acrylate-based monomer; a vinyl cyanide-based monomer; a vinyl ether-based monomer; a vinyl carboxylate-based monomer; an olefin-based monomer; and a diene-based monomer. In particular, an alkyl (meth)acrylate-based monomer is preferably used. The alkyl (meth)acrylate-based monomer refers to both alkyl acrylate-based and alkyl methacrylate-based monomers.

The polymerization of those monomers provides the organic polymer particles. One of the monomers can be used, or two or more thereof can be used as a mixture. The organic polymer particles are preferably particles each formed of an alkyl (meth)acrylate-based copolymer.

The blending amount of the flame retardant aid is preferably from 0.1 part by mass to 2 parts by mass, more preferably from 0.3 part by mass to 1.5 parts by mass with respect to 100 parts by mass of the component (A).

Examples of the inorganic filler may include talc, mica, kaolin, diatomaceous earth, calcium carbonate, calcium sulfate, barium sulfate, glass fibers, carbon fibers, and potassium titanate fibers. Among them, for example, talc and mica, each of which has a plate shape, and fibrous fillers, such as glass fibers and carbon fibers, are preferred. Blending the inorganic filler can further improve the flame retardancy and dimensional stability.

One of those inorganic fillers may be used alone, or two or more thereof may be used in combination.

The blending amount of the inorganic filler is preferably from 0.1 part by mass to 10 parts by mass, more preferably from 0.5 part by mass to 5 parts by mass with respect to 100 parts by mass of the component (A). When the blending amount is 0.1 part by mass or more, improving effects on the flame retardancy and the dimensional stability can be sufficiently obtained. When the blending amount is 10 parts by mass or less, the flowability and impact resistance of the resin composition are easily maintained.

Examples of the colorant include dyes such as a perylene-based dye, a coumarin-based dye, a thioindigo-based dye, an anthraquinone-based dye, a thioxanthone-based dye, a ferrocyanide, a perinone-based dye, a quinoline-based dye, and a phthalocyanine-based dye.

<Physical Properties of Polycarbonate Resin Composition>

The polycarbonate resin composition of the present invention contains the components (A) to (D) and satisfies the following expression (a).

$$(Sf-37) \times Ch/(Bd+Si) \geq 37 \tag{a}$$

In the expression (a), $Sf$ represents a flow length (cm) when the resin composition is molded with a spiral flow mold having a cylinder temperature of 240° C., a mold temperature of 40° C., and a thickness of 2.0 mm at a pressure setting of 125 MPa, $Ch$ represents a Charpy impact strength ($kJ/m^2$) at a temperature of 23° C. when the resin composition is molded into a molded body having a thickness of 4 mm, $Bd$ represents the content (mass %) of the constituent unit derived from butadiene in the resin composition, and $Si$ represents the content (mass %) of the polyorganosiloxane block moiety in the resin composition.

When a value for the expression (a) is less than 37, it becomes difficult for the resin composition to achieve all of its flowability, impact resistance, and flame retardancy at high levels in a balanced manner.

The value for the expression (a) is preferably 40 or more, more preferably 50 or more, still more preferably 60 or more from the viewpoint that all of the flowability, the impact resistance, and the flame retardancy are achieved at high levels in a balanced manner.

A value for the $Sf$ is specifically measured by a method described in Examples. A value for the Charpy impact strength $Ch$ is measured by using a notched test piece produced from the molded body having a thickness of 4 mm in conformity with ISO 179 at a temperature of 23° C., and can be specifically measured by a method described in Examples. As described above, a value for the $Si$ can be calculated by nuclear magnetic resonance (NMR) measurement.

It is preferred that the polycarbonate resin composition of the present invention further satisfy the following expression (b), and a molded body thereof having a thickness of 1.5 mm possesses a flame retardancy satisfying a 5VB rank in accordance with an Underwriters Laboratory Subject 94 (UL94) standard.

$$(Sf-37) \times Ch/(Bd+Si) - 0.05Vh \geq 32 \tag{b}$$

In the expression (b), $Sf$, $Ch$, $Bd$, and $Si$ are the same as those described above, and $Vh$ represents the total (seconds)

of 5 combustion times in the 5V flame test of the UL94 standard. In the flame test, the molded body is extinguished without dripping.

When a value for the expression (b) is 32 or more, the resin composition can achieve all of the flowability, the impact resistance, and the flame retardancy at higher levels in a balanced manner. From the above viewpoint, the value for the expression (b) is more preferably 34 or more, still more preferably 40 or more.

A value for the Vh and the rank of the flame retardancy can be measured through the use of a molded body having a thickness of 1.5 mm molded out of the polycarbonate resin composition of the present invention by a vertical flame test in conformity with the UL94 standard, and can be specifically measured by a method described in Examples. The combustion time Vh is the total of combustion times when the 5V flame test of the UL94 standard is performed 5 times.

A preferred range of each of the Sf and the Ch is as described below.

The flow length Sf of the polycarbonate resin composition of the present invention is typically 38 cm or more, preferably 42 cm or more, more preferably 45 cm or more. As described above, the polycarbonate resin composition of the present invention has high flowability, and hence can be molded into, for example, a thin-walled and large-sized molded body.

The Charpy impact strength Ch of the polycarbonate resin composition of the present invention is as follows: a measured value at a temperature of 23° C. when the resin composition is molded into a molded body having a thickness of 4 mm is typically 15 $kJ/m^2$ or more, preferably 20 $kJ/m^2$ or more, more preferably 30 $kJ/m^2$ or more.

<Method of Producing Polycarbonate Resin Composition>

Next, a method of producing the polycarbonate resin composition of the present invention is described.

The polycarbonate resin composition of the present invention is obtained by blending the components (A) to (D) and any other general component, and kneading the components.

The blending and the kneading at this time can be performed by the following method: the components are preliminarily mixed by using a typically used apparatus, such as a ribbon blender or a drum tumbler, and are then mixed by using, for example, a Henschel mixer, a Banbury mixer, a single screw extruder, a twin screw extruder, a multi-screw extruder, or a Ko-kneader.

In normal cases, a heating temperature at the time of the kneading is appropriately selected from the range of from 240° C. to 300° C.

The components except the polycarbonate resin (A) can be melt-kneaded with the polycarbonate resin (A) in advance, i.e., can be added as a master batch.

[Molded Body]

A molded body of the present invention contains the polycarbonate resin composition of the present invention.

The molded body of the present invention is obtained as follows: a composition obtained by melt-kneading the polycarbonate resin composition of the present invention with the melt-kneading molding machine, or a pellet obtained from the composition is used as a raw material, and the raw material is molded by, for example, an injection molding method, an injection compression molding method, an extrusion molding method, a blow molding method, a press molding method, a vacuum molding method, or a foam molding method.

The molded body can be particularly suitably obtained by: producing a pellet-shaped molding raw material by the melt-kneading method; and then subjecting the pellet to injection molding or injection compression molding.

A gas injection molding method for the prevention of a sink mark on the external appearance of the molded body or for the weight reduction thereof can also be adopted as an injection molding method.

<Physical Properties of Molded Body>

The molded body of the polycarbonate resin composition of the present invention obtained as described above has the following characteristic values: the bending strength of a test piece having a thickness of 4 mm, which is produced from the molded body, measured in conformity with ISO 178 at 23° C. is typically from 85 MPa to 95 MPa, and the bending modulus thereof is typically from 2,000 MPa to 3,000 MPa.

Each of the characteristic values is specifically measured by a method described in Examples.

The molded body of the present invention is excellent in heat resistance. Specifically, the heat deflection temperature (HDT) of a test piece having a thickness of 4 mm, which is produced from the molded body, measured at a load of 1.8 MPa is typically 70° C. or more, preferably 75° C. or more. The HDT can be measured in conformity with ISO 75-1,2, and can be specifically measured by a method described in Examples.

The polycarbonate resin composition of the present invention and the molded body containing the resin composition can each be suitably used in, for example, an automobile part (such as an exterior, an interior, or a meter panel), or the housing of electronic equipment or information equipment.

EXAMPLES

The present invention is described in more detail by way of Examples. However, the present invention is by no means limited by these Examples.

Preparation Example 1

<Production of Polycarbonate Oligomer>

Sodium dithionite was added in an amount of 2,000 ppm with respect to bisphenol A (BPA) to be dissolved later to 5.6 mass % aqueous sodium hydroxide, and then bisphenol A was dissolved in the mixture so that the concentration of bisphenol A was 13.5 mass %. Thus, a solution of bisphenol A in aqueous sodium hydroxide was prepared.

The solution of bisphenol A in aqueous sodium hydroxide, methylene chloride, and phosgene were continuously passed through a tubular reactor having an inner diameter of 6 mm and a tube length of 30 m at flow rates of 40 L (L is hereinafter used as an abbreviation of liter(s))/hr, 15 L/hr, and 4.0 kg/hr, respectively.

The tubular reactor had a jacket portion and the temperature of the reaction liquid was kept at 40° C. or less by passing cooling water through the jacket.

The reaction liquid that had exited the tubular reactor was continuously introduced into a baffled vessel type reactor provided with a sweptback blade and having an internal volume of 40 L. The solution of bisphenol A in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction.

An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 329 g/L and a chloroformate group concentration of 0.74 mol/L.

Production Example 1

<Production of Polycarbonate-polydimethylsiloxane Copolymer (PC-PDMS Copolymer 1)>

15 L of the polycarbonate oligomer solution produced in Preparation Example 1, 9.0 L of methylene chloride, 384 g of an o-allylphenol terminal-modified polydimethylsiloxane (PDMS) having an average number n of repetitions of a dimethylsiloxane repeating unit of 90, and 8.8 mL of triethylamine were loaded into a 50 L vessel type reactor provided with a baffle board, a paddle type stirring blade, and a cooling jacket. 1,389 g of 6.4 mass % aqueous sodium hydroxide was added to the mixture under stirring to perform a reaction between the polycarbonate oligomer and the allylphenol terminal-modified PDMS for 10 minutes.

A solution of p-t-butylphenol (PTBP) in methylene chloride (prepared by dissolving 137 g of PTBP in 2.0 L of methylene chloride) and a solution of bisphenol A in aqueous sodium hydroxide (prepared by dissolving 1,012 g of bisphenol A in an aqueous solution prepared by dissolving 577 g of sodium hydroxide and 2.0 g of sodium dithionite in 8.4 L of water) were added to the polymerization liquid to perform a polymerization reaction for 50 minutes.

10 L of methylene chloride was added to the resultant for dilution and then the mixture was stirred for 10 minutes. After that, the mixture was separated into an organic phase containing a polycarbonate-polydimethylsiloxane copolymer (PC-PDMS copolymer), and an aqueous phase containing excess amounts of bisphenol A and sodium hydroxide, and then the organic phase was isolated.

The solution of the PC-PDMS copolymer in methylene chloride thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 0.01 μS/m or less.

The solution of the PC-PDMS copolymer in methylene chloride obtained by the washing was concentrated and pulverized, and then the resultant flake was dried under reduced pressure at 120° C. Thus, a PC-PDMS copolymer 1 was produced.

The content of the PDMS block moiety of the resultant PC-PDMS copolymer 1 determined by nuclear magnetic resonance (NMR) was 6.0 mass %, and the viscosity number and viscosity-average molecular weight Mv of the copolymer were 47.5 and 17,700, respectively.

Production Example 2

<Production of Polycarbonate-polydimethylsiloxane Copolymer (PC-PDMS Copolymer 2)>

A PC-PDMS copolymer 2 was produced in the same manner as in Production Example 1 except that an o-allylphenol terminal-modified PDMS having an average number n of repetitions of a dimethylsiloxane repeating unit of 40 was used.

The content of the PDMS block moiety of the resultant PC-PDMS copolymer 2 determined by NMR was 6.0 mass %, and the viscosity number and viscosity-average molecular weight Mv of the copolymer were 47.5 and 17,700, respectively.

The average number of repetitions of the PDMS of the allylphenol terminal-modified polydimethylsiloxane used in each of the production examples, the usage amount of the PDMS, the usage amount of p-t-butylphenol (PTBP), and the content of the PDMS block moiety, viscosity number, and viscosity-average molecular weight Mv of each of the resultant polycarbonate-polydimethylsiloxane copolymers are shown in Table 1. The viscosity number measured in each of Production Examples of the present invention is a value measured in conformity with ISO 1628-4 (1999).

TABLE 1

| | Production Example | |
|---|---|---|
| | 1 | 2 |
| Average number n of repetitions of PDMS | 90 | 40 |
| Usage amount of PDMS (g) | 384 | 384 |
| Usage amount of PTBP (g) | 137 | 137 |
| Content of PDMS block moiety (mass %) | 6.0 | 6.0 |
| Viscosity number | 47.5 | 47.5 |
| Viscosity-average molecular weight Mv | 17,700 | 17,700 |

[Performance Evaluation]
<Flowability Evaluation>
(MFR)

A MFR at a temperature of 260° C. and a load of 2.16 kg was measured in conformity with ASTM D1238.

(Q Value)

A Q value at a temperature of 260° C. and a load of 100 kg was measured in conformity with JIS K7210 with a Koka flow tester.

(SFL Value)

A flow length (cm) when a pellet obtained in each of the examples was molded with a spiral flow mold having a cylinder temperature of 240° C., a mold temperature of 40° C., and a thickness of 2.0 mm at a pressure setting of 125 MPa was measured.

<Impact Resistance Evaluation>
(Charpy Impact Strength)

A notched test piece was produced from a test piece having a thickness of 4 mm obtained in each of the examples, and its Charpy impact strength was measured in conformity with ISO 179 at a temperature of 23° C. A larger numerical value therefor means that the impact resistance of the test piece is more satisfactory.

<Mechanical Characteristic Evaluation>
(Bending Test)

The bending strength and bending modulus of the test piece having a thickness of 4 mm obtained in each of the examples were measured in conformity with ISO 178 under the conditions of a temperature of 23° C. and a bending rate of 2 mm/min. Larger numerical values for the bending strength and the bending modulus mean that the bending characteristics of the test piece are more satisfactory.

<Heat Resistance Evaluation>
(Heat Deflection Temperature)

The heat deflection temperature (HDT) of the test piece having a thickness of 4 mm obtained in each of the examples was measured in conformity with the measurement method of ISO 75-1,2 at a load of 1.8 MPa. A higher heat deflection temperature means that the heat resistance of the test piece is more satisfactory.

<Flame Retardancy Evaluation>
(UL94 Combustibility)

A test piece measuring 127 mm long by 12.7 mm wide by 1.5 mm thick obtained in each of the examples was subjected to a 5V flame test (n=5) in conformity with an Underwriters Laboratory Subject 94 (UL94) vertical flammability test, and the total (seconds) of 5 combustion times was determined and defined as Vh. In addition, a flame retardancy evaluation was performed by judging whether or not a 5V rank was satisfied.

A molded body having a thickness of 1.5 mm obtained by molding each of the polycarbonate resin compositions described in Examples satisfied a 5VB rank, and was extinguished without dripping.

In the flame retardancy evaluation of Table 2, a molded body that satisfied the 5V rank is represented by "5V", and a molded body that did not satisfy the 5V rank is represented by "5V-OUT".

Examples 1 to 8 and Comparative Examples 1 to 8

Respective components were mixed at ratios shown in Table 2, and the mixture was granulated with a vented single screw extruder having a diameter of 50 mm at a resin temperature of 280° C. to provide a pellet formed of a polycarbonate resin composition.

The pellet obtained by the method was subjected to injection molding with an injection molding machine (model number; IS100EN, manufactured by Toshiba Machine Co., Ltd.) under the molding conditions of a cylinder temperature of 240° C. and a mold temperature of 40° C. to provide a test piece. The foregoing performance evaluations were performed by using the resultant test piece.

Details about the respective components shown in Table 2 used in Examples and Comparative Examples are as described below.

<Polycarbonate-polyorganosiloxane Copolymer (A-1)>

PC-PDMS copolymer 1 (polycarbonate-polydimethylsiloxane copolymer described in Production Example 1)

PC-PDMS copolymer 2 (polycarbonate-polydimethylsiloxane copolymer described in Production Example 2)

<Aromatic Polycarbonate Resin (A-2)>

TARFLON FN2200 (bisphenol A polycarbonate, manufactured by Idemitsu Kosan Co., Ltd., viscosity number: 56.1, viscosity-average molecular weight Mv=21,500)

TARFLON FN1900 (bisphenol A polycarbonate, manufactured by Idemitsu Kosan Co., Ltd., viscosity number: 51.0, viscosity-average molecular weight Mv=19,200)

TARFLON FN1700 (bisphenol A polycarbonate, manufactured by Idemitsu Kosan Co., Ltd., viscosity number: 47.5, viscosity-average molecular weight Mv=17,700)

<Acrylonitrile-butadiene-styrene Terpolymer (B-1)>

KRALASTIC SXH-330 (acrylonitrile-butadiene-styrene terpolymer (ABS), manufactured by Nippon A&L Inc., content of constituent unit derived from butadiene; 12 mass %)

HR181 (acrylonitrile-butadiene-styrene terpolymer (ABS), manufactured by Kumho Petrochemical Co., Ltd., content of constituent unit derived from butadiene; 60 mass %)

SANTAC AT05 (acrylonitrile-butadiene-styrene terpolymer (ABS), manufactured by Nippon A&L Inc., content of constituent unit derived from butadiene; 14 mass %)

<Acrylonitrile-styrene Bipolymer (B-2)>

S101N (acrylonitrile-styrene bipolymer (AS), manufactured by UMG ABS, Ltd., MVR [temperature: 200° C., load: 10 kgf]; 95 cm$^3$/10 minutes)

<Copolymer (C)>

PARALOID EXL2603 (methyl methacrylate-butadiene bipolymer (MB), manufactured by The Dow Chemical Company)

METABLEN C223A (methyl methacrylate-butadiene-styrene terpolymer (MBS), manufactured by Mitsubishi Rayon Co., Ltd.)

<Flame Retardant (D)>

CR-741 (aromatic condensed phosphate-based flame retardant, manufactured by Daihachi Chemical Industry Co., Ltd.)

<Flame Retardant Aid>

Fluon AD939E (PTFE aqueous dispersion liquid, manufactured by Asahi Glass Co., Ltd.)

Various evaluation results are shown in Table 2.

TABLE 2

| | | | Unit | Example 1 | 2 | 3 | 4 | 5 | 6 | 7 | 8 |
|---|---|---|---|---|---|---|---|---|---|---|---|
| Polycarbonate resin composition | (A-1) | PC-PDMS copolymer 1 | Production Example 1 | Parts by mass | 15.6 | | 22.7 | | 25.0 | | 50.0 | 50.0 |
| | | PC-PDMS copolymer 2 | Production Example 2 | Parts by mass | | 18.8 | | 22.7 | | 25.0 | | |
| | (A-2) | Aromatic (bisphenol A) PC | FN2200 | Parts by mass | 50.0 | 50.0 | 50.0 | 50.0 | 50.0 | 50.0 | 50.0 | 50.0 |
| | | Aromatic (bisphenol A) PC | FN1900 | Parts by mass | | | | | | | | |
| | | Aromatic (bisphenol A) PC | FN1700 | Parts by mass | 34.4 | 31.3 | 27.3 | 27.3 | 25.0 | 25.0 | | |
| | (B-1) | ABS | SXH-330 | Parts by mass | 26.6 | 26.6 | | | 26.6 | 26.6 | 26.6 | |
| | | ABS | HR181 | Parts by mass | | | 10.6 | 10.6 | | | | 10.6 |
| | | ABS | AT05 | Parts by mass | | | | | | | | |
| | (B-2) | AS | S101N | Parts by mass | 3.1 | 3.1 | 15.2 | 15.2 | 3.1 | 3.1 | 3.1 | 15.2 |
| | (C) | MB | EXL2603 | Parts by mass | 3.1 | 3.1 | 3.0 | 3.0 | 3.1 | 3.1 | 3.1 | 3.0 |
| | | MBS | C223A | Parts by mass | | | | | | | | |
| | (D) | Condensed phosphate-based flame retardant | CR741 | Parts by mass | 23.4 | 23.4 | 22.7 | 22.7 | 23.4 | 23.4 | 23.4 | 22.7 |
| | Flame retardant aid | PTFE aqueous dispersion liquid | AD939E | Parts by mass | 0.8 | 0.8 | 0.8 | 0.8 | 0.8 | 0.8 | 0.8 | 0.8 |
| | Viscosity-average molecular weight (Mv) of component (A) | | — | 19600 | 19600 | 19600 | 19600 | 19600 | 19600 | 19600 | 19600 |
| | Content of POS moiety in component (A) | | mass % | 0.94 | 1.13 | 1.36 | 1.36 | 1.50 | 1.50 | 3.00 | 3.00 |
| | Content (Si) of POS moiety in composition | | mass % | 0.60 | 0.72 | 0.90 | 0.90 | 0.96 | 0.96 | 1.91 | 1.97 |
| | Content (Bd) of constituent unit derived from butadiene | | mass % | 3.6 | 3.6 | 5.7 | 5.7 | 3.6 | 3.6 | 3.5 | 5.7 |
| | Content (St) of constituent unit derived from styrene | | mass % | 12.0 | 12.0 | 9.2 | 9.2 | 12.0 | 12.0 | 12.0 | 9.2 |
| | Content (An) of constituent unit derived from acrylonitrile | | mass % | 4.7 | 4.7 | 3.4 | 3.4 | 4.7 | 4.7 | 4.7 | 3.4 |
| | Bd + Si | | mass % | 4.2 | 4.3 | 6.6 | 6.6 | 4.6 | 4.6 | 5.4 | 7.7 |

TABLE 2-continued

| Evaluation result | | | | Unit | 1 | 2 | 3 | 4 | 5 | 6 | 7 | 8 |
|---|---|---|---|---|---|---|---|---|---|---|---|---|
| Flowability | MFR | 260° C., 216 kg | | g/10 min | 30 | 32 | 25 | 28 | 28 | 31 | 31 | 23 |
| | Q value | 260° C., 100 kg | | $10^{-2}$ mL/s | 24 | 30 | 35 | 32 | 32 | 33 | 31 | 31 |
| | SFL (2 mm) (Sf) | 240° C./125 MPa | | cm | 46 | 46 | 46 | 45 | 47 | 46 | 46 | 46 |
| Impact resistance | Charpy impact strength (Ch) | 23° C. | | kJ/m² | 28 | 31 | 53 | 32 | 38 | 40 | 48 | 55 |
| Mechanical characteristic | Bending strength | 23° C. | | MPa | 92 | 94 | 88 | 88 | 91 | 93 | 90 | 87 |
| | Bending modulus | 23° C. | | MPa | 2,566 | 2,568 | 2,462 | 2,451 | 2,545 | 2,553 | 2,513 | 2,390 |
| Heat resistance | Heat deflection temperature (HDT) | 1.8 MPa | | ° C. | 77 | 77 | 77 | 76 | 77 | 77 | 75 | 75 |
| Flame retardancy | UL94 flame test (1.5 mm) | Combustion time Vn (total of n = 5) | | Second(s) | 50 | 75 | 36 | 93 | 93 | 97 | 93 | 50 |
| | | Judgment | | — | 5 V | 5 V | 5 V | 5 V | 5 V | 5 V | 5 V | 5 V |
| Expression (a): (Sf − 37) × Ch/(Bd + Si) | | | | — | 60 | 65 | 72 | 39 | 83 | 79 | 80 | 65 |
| Expression (b): (Sf − 37) × Ch/(Bd + Si) − 0.05 Vn | | | | — | 58 | 61 | 71 | 34 | 79 | 74 | 75 | 62 |

| | | | | | Comparative Example | | | | | | | |
|---|---|---|---|---|---|---|---|---|---|---|---|---|
| Polycarbonate resin composition | | | | Unit | 1 | 2 | 3 | 4 | 5 | 6 | 7 | 8 |
| (A-1) | PC-PDMS copolymer 1 | Production Example 1 | | Parts by mass | 50.0 | 50.0 | | | | | | 100.0 |
| | PC-PDMS copolymer 2 | Production Example 2 | | Parts by mass | 50.0 | 50.0 | | | | | 100.0 | |
| (A-2) | Aromatic (bisphenol A) PC | FN2200 | | Parts by mass | | | 50.0 | 48.5 | 48.5 | | | |
| | Aromatic (bisphenol A) PC | FN1900 | | Parts by mass | | | | | | 100.0 | | |
| | Aromatic (bisphenol A) PC | FN1700 | | Parts by mass | | | 37.9 | | | | | |
| (B-1) | ABS | SXH-330 | | Parts by mass | 26.6 | | | | | | | |
| | ABS | HR181 | | Parts by mass | | 10.6 | 10.6 | | | | | |
| | ABS | AT05 | | Parts by mass | | | | 25.8 | 10.3 | | | |
| (B-2) | AS | S101N | | Parts by mass | 3.1 | 15.2 | 15.2 | | 14.7 | | | |
| (C) | MB | EXL2603 | | Parts by mass | | 3.0 | 3.0 | 3.0 | | | | |
| | MBS | C223A | | Parts by mass | 3.1 | | | | | | | |
| (D) | Condensed phosphate-based flame retardant | CR741 | | Parts by mass | 23.4 | 22.7 | 22.7 | 22.7 | 22.1 | 100.0 | 100.0 | 100.0 |

TABLE 2-continued

| | | | | | | | | | | |
|---|---|---|---|---|---|---|---|---|---|---|
| Flame retardant aid | PTFE aqueous dispersion liquid | AD939E | Parts by mass | 0.8 | 0.8 | 0.8 | 0.8 | 0.8 | 0.8 | 0.8 |
| | Viscosity-average molecular weight (Mv) of component (A) | | — | 20400 | 20400 | 19600 | 19500 | 19500 | 19200 | 17700 | 17700 |
| | Content of POS moiety in component (A) | | mass % | 0.00 | 0.00 | 0.73 | 1.45 | 1.32 | 0.00 | 0.00 | 6.00 |
| | Content (Si) of POS moiety in composition | | mass % | 0.00 | 0.00 | 0.48 | 0.95 | 0.90 | 0.00 | 0.00 | 3.00 |
| | Content (Bd) of constituent unit derived from butadiene | | mass % | 3.5 | 5.7 | 5.7 | 2.0 | 4.1 | 6.9 | 6.9 | 6.9 |
| | Content (St) of constituent unit derived from styrene | | mass % | 12.0 | 9.2 | 9.2 | 12.0 | 9.2 | 6.9 | 6.9 | 6.9 |
| | Content (An) of constituent unit derived from acrylonitrile | | mass % | 4.7 | 3.4 | 3.4 | 4.7 | 3.4 | 0.0 | 3.0 | 3.0 |
| | Bd + Si | | mass % | 3.5 | 5.7 | 6.2 | 3.0 | 5.0 | 6.9 | 9.9 | 9.9 |
| Evaluation result | Flowability | MFR | 260° C., 216 kg | g/10 min | 35 | 20 | 28 | 42 | 33 | 20 | 16 | 16 |
| | | Q value | 260° C., 100 kg | $10^{-2}$ mL/s | 38 | 38 | 21 | 23 | 21 | 21 | 23 | 21 |
| | | SFL (2 mm) (Sf) | 240° C./ 40° C./ 125 MPa | cm | 45 | 44 | 46 | 47 | 46 | — | — | — |
| | Impact resistance | Charpy impact strength (Ch) | 23° C. | kJ/m$^2$ | 13 | 14 | 22 | 10 | 12 | 63 | 70 | 91 |
| | Mechanical characteristic | Bending strength | 23° C. | MPa | 94 | 92 | 90 | 97 | 93 | 79 | 74 | 71 |
| | | Bending modulus | 23° C. | MPa | 2,618 | 2,518 | 2,495 | 2,655 | 2,549 | 2,166 | 2,068 | 2,062 |
| | Heat resistance | Heat deflection temperature (HDT) | 1.8 MPa | ° C. | 77 | 78 | 77 | 77 | 77 | 96 | 92 | 93 |
| | Flame retardancy | UL94 flame test (1.5 mm) | Combustion time Vn (total of n = 5) | Second (s) | 41 | 50 | 40 | 40 | 25 | — | — | — |
| | | | Judgment | | 5 V 29 | 5 V 17 | 5 V 32 | 5 V 32 | 5 V 22 | 5 V-OUT | 5 V-OUT | 5 V-OUT |
| Expression (a); (Sf − 37) × Ch/(Bd + Si) | | | | — | 27 | 15 | 30 | 30 | 20 | — | — | — |
| Expression (b); (Sf − 37) × Ch/(Bd + Si) − 0.05 Vn | | | | — | | | | | | | | |

As can be seen from Table 2, the polycarbonate resin composition of the present invention is excellent in flowability, flame retardancy, and impact resistance, and its mechanical characteristics and heat resistance are satisfactory.

INDUSTRIAL APPLICABILITY

According to the present invention, there can be provided a polycarbonate resin composition that is excellent in flowability and flame retardancy, and can provide a molded body having a high impact strength. The resin composition is suitably used in, for example, an automobile part (such as an exterior, an interior, or a meter panel), or the housing of electronic equipment or information equipment because the resin composition can be molded into a thin-walled and large-sized molded body.

The invention claimed is:
1. A polycarbonate resin composition, comprising:
(A) a polycarbonate resin (A) comprising a polycarbonate-polyorganosiloxane copolymer (A-1) having a polycarbonate block comprising a repeating unit represented by the general formula (I) and a polyorganosiloxane block comprising a repeating unit represented by the general formula (II):

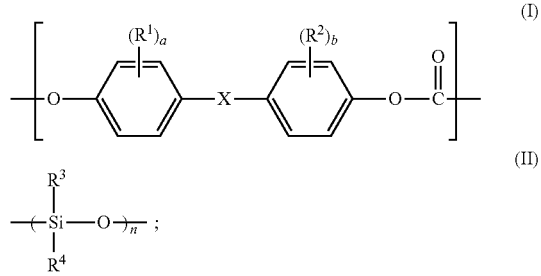

(B) a copolymer (B) having constituent units derived from acrylonitrile and styrene, and being free of a constituent unit derived from methyl methacrylate;
(C) a copolymer (C) having constituent units derived from butadiene and methyl methacrylate; and
(D) a flame retardant (D),
wherein:
a content of the polyorganosiloxane block comprising the repeating unit represented by the general formula (II) ranges from 0.70 mass % to 10 mass %, based on a total mass of the polycarbonate resin composition;
the polycarbonate resin composition satisfies the expression (a):

$$(Sf-37) \times Ch/(Bd+Si) \geq 37 \quad \text{(a)}$$

Sf represents a flow length (cm) when the resin composition is molded with a spiral flow mold having a cylinder temperature of 240° C., a mold temperature of 40° C., and a thickness of 2.0 mm at a pressure setting of 125 MPa;
Ch represents a Charpy impact strength (kJ/m$^2$) at a temperature of 23° C. when the resin composition is molded into a molded body having a thickness of 4 mm;
Bd represents a content (mass %) of the constituent unit derived from butadiene in the resin composition;
Si represents a content (mass %) of the polyorganosiloxane block moiety in the resin composition;

$R^1$ and $R^2$ each independently represent a halogen atom, an alkyl group having 1 to 6 carbon atoms, or an alkoxy group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—;
$R^3$ and $R^4$ each independently represent a hydrogen atom, a halogen atom an alkyl group having 1 to 6 carbon atoms, an alkoxy group having 1 to 6 carbon atoms, or an aryl group having 6 to 12 carbon atoms;
a and b each independently represent an integer of from 0 to 4; and
n represents an average number of repetitions.
2. The polycarbonate resin composition according to claim 1, wherein:
the polycarbonate resin composition further satisfies the following expression (b) and flame retardancy by a UL94 standard in a molded body thereof having a thickness of 1.5 mm satisfies a 5VB rank:

$$(Sf-37) \times Ch/(Bd+Si) - 0.05Vh \geq 32 \quad \text{(b)}$$

Sf, Ch, Bd, and Si are the same as those in the expression (a); and
Vh represents a total (seconds) of 5 combustion times in a 5V flame test of the UL94 standard, and in the flame test, the molded body is extinguished without dripping.
3. The polycarbonate resin composition according to claim 1, wherein the copolymer (B) comprises an acrylonitrile-butadiene-styrene terpolymer (B-1).
4. The polycarbonate resin composition according to claim 3, wherein the copolymer (B) further comprises an acrylonitrile-styrene bipolymer (B-2).
5. The polycarbonate resin composition according to claim 1, wherein the copolymer (C) comprises at least one selected from the group consisting of a methyl methacrylate-butadiene-styrene terpolymer and a methyl methacrylate-butadiene bipolymer.
6. The polycarbonate resin composition according to claim 3, wherein a content of a constituent unit derived from butadiene in the component (B-1) is from 8 mass % to 75 mass %.
7. The polycarbonate resin composition according to claim 4, wherein a melt volume rate (MVR) of the component (B-2) measured at a temperature of 200° C. and a load of 10 kgf is from 3 cm$^3$/10 min to 150 cm$^3$/10 min.
8. The polycarbonate resin composition according to claim 1, wherein the flame retardant (D) comprises a phosphorus-based flame retardant.
9. The polycarbonate resin composition according to claim 8, wherein the phosphorus-based flame retardant comprises a condensed phosphate.
10. The polycarbonate resin composition according to claim 1, wherein the polycarbonate resin (A) has a viscosity-average molecular weight of from 10,000 to 30,000.
11. The polycarbonate resin composition according to claim 1, wherein the flow length Sf is 35 cm or more.
12. The polycarbonate resin composition according to claim 1, wherein the Charpy impact strength Ch is 15 kJ/m$^2$ or more.
13. A molded body, comprising the polycarbonate resin composition of claim 1.

* * * * *